United States Patent [19]

Baranowski, Jr.

[11] 4,324,269
[45] Apr. 13, 1982

[54] PRESSURE REGULATOR

[76] Inventor: Frank Baranowski, Jr., 7 Pine St., Lynnfield Center, Mass. 01940

[21] Appl. No.: 169,156

[22] Filed: Jul. 15, 1980

[51] Int. Cl.³ .............................................. F16K 43/00
[52] U.S. Cl. ................................ 137/315; 137/505.39; 137/505.42
[58] Field of Search ........... 137/454.6, 505.18, 505.38, 137/505.39, 505.41, 505.42, 315

[56] References Cited

U.S. PATENT DOCUMENTS

| | | | |
|---|---|---|---|
| 2,888,033 | 5/1959 | Fickmeyer | 137/505 |
| 3,590,860 | 7/1971 | Stenner | 137/505.39 X |
| 3,699,998 | 10/1972 | Baranowski | 137/505.42 X |
| 3,978,880 | 9/1976 | Crown | 137/505.39 X |

FOREIGN PATENT DOCUMENTS 1286123  1/1962  France ............................ 137/505.42

Primary Examiner—Harold W. Weakley
Attorney, Agent, or Firm—James E. Mrose

[57] ABSTRACT

Regulation of pressure at which fluid is allowed to flow is determined by a device which is externally substantially monolithic in character and includes internal components assembled within it through an end coupling. Relatively low height and small girth are promoted by unique communication of internal flow around the edge of a diaphragm from one side and which is distinctively sealed only along the opposite side.

3 Claims, 3 Drawing Figures

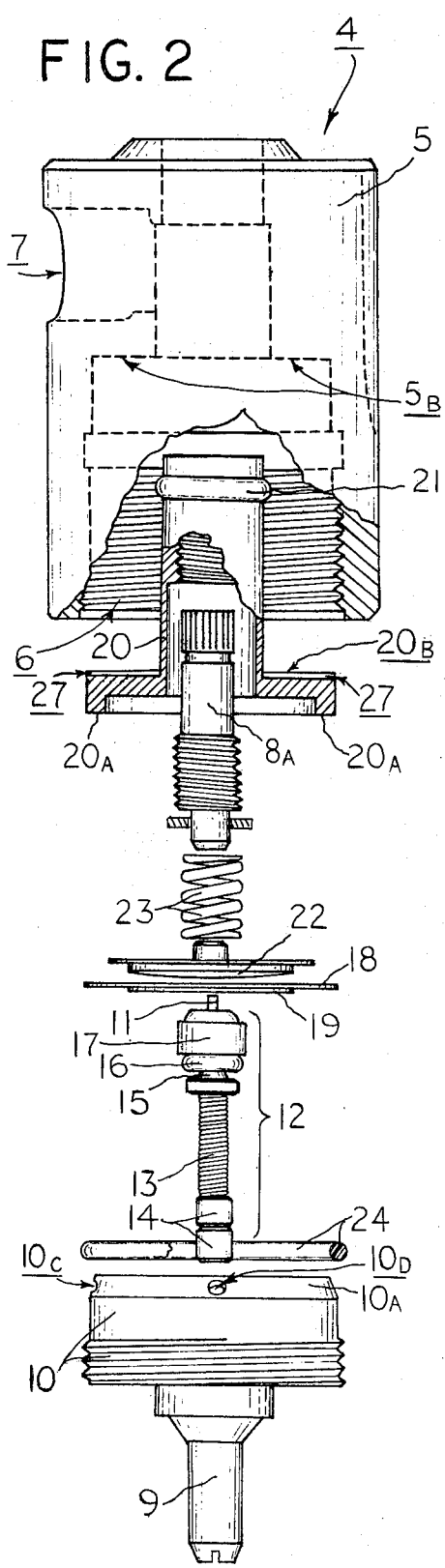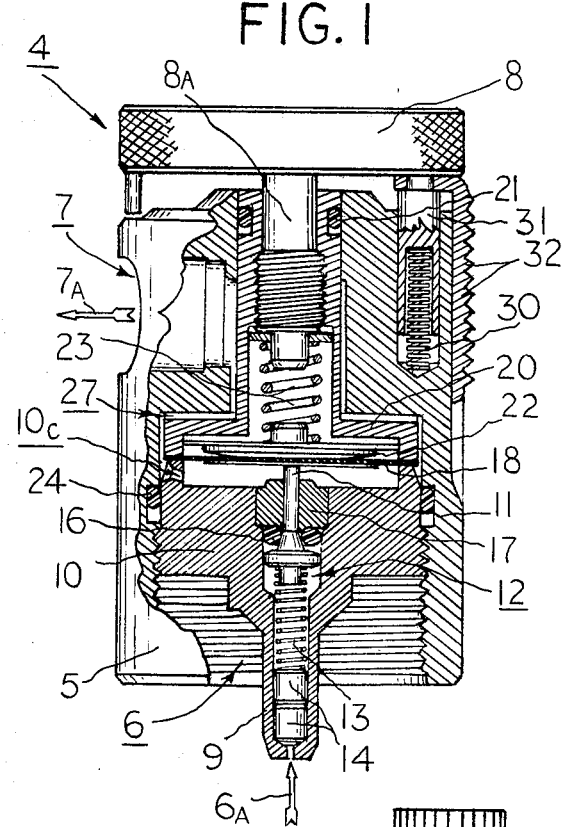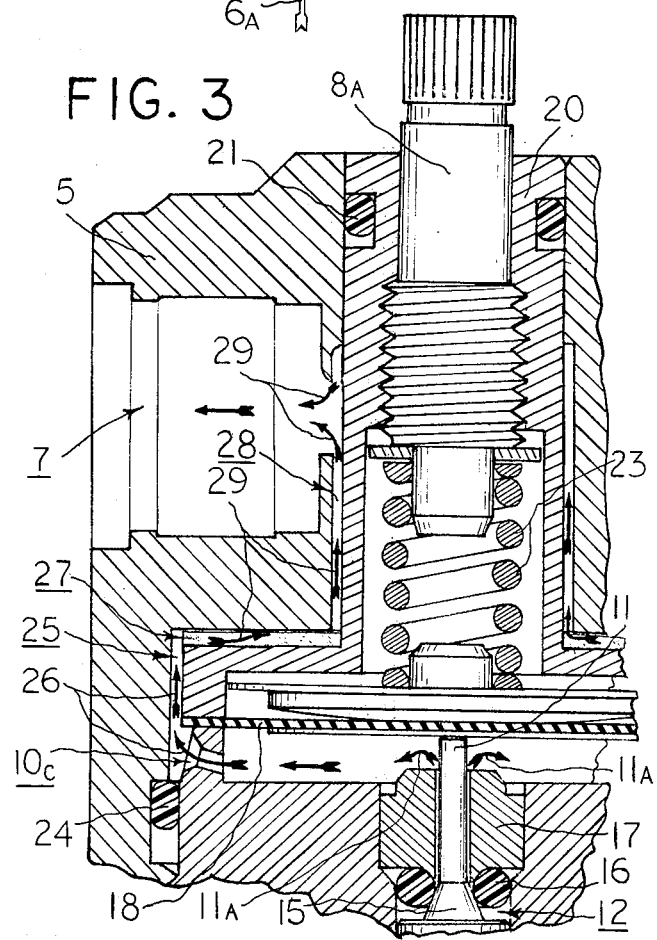

PRESSURE REGULATOR

BACKGROUND OF THE INVENTION

The present invention related to improvements in miniaturized high-precision pressure regulators, and, in one particular aspect, to unique and advantageous pressure-regulator constructions wherein valved flow under control of a spring-biased diaphragm is directed around and past the rim of a diaphragm which is separately sealed along but one side, the related form of the body in such a regulator being of relatively small bulk and allowing for the substantially concealed enclosure of internal components which are readily assembled through one end port.

A conventional arrangement of elements of a pressure regulator typically includes a main valve having an axially-movable stem which is normally biased toward closure but is automatically opened, as required, to maintain a predetermined downstream pressure condition as the result of imbalances occurring between a counter-acting spring and an opposing pressure-responsive diaphragm. Many such devices are called upon to maintain pressure with great accuracy, over significant ranges of pressure and under severe environmental conditions of use. Both in their refined laboratory versions and in common industrial and consumer-orientated designs, it is generally important that manufacturing costs be minimized and that the product be readily usable but substantially tamper-proof. Because of the physical relationships which the diaphragm and main valve of such regulators tend to assume, flow out of the valve generally courses laterally in relation to the diaphragm, and the regulated output is expediently tapped from the body in a lateral direction as well. The diaphragm, which senses differences between an ambient pressure and the downstream pressure, must generally be sealed tight, and conventional practice has involved its convenient edge-clamping between body parts. Efforts to satisfy the numerous technical requirements for such devices has often resulted in complex multi-part bodies which are relatively bulky, costly to manufacture, and susceptible to damage or tampering.

An adjustable pressure regulator generally along the aformentioned lines was long ago discussed in U.S. Pat. No. 1,244,226, and later in U.S. Pat. No. 3,590,860, and in my own U.S. Pat. No. 3,699,998.

SUMMARY OF THE INVENTION

The present invention is aimed at creating improved pressure regulators of inexpensive, uncomplicated, rugged and highly compact construction which will reliably regulate fluid flow with precision and sensitivity, and which, in preferred embodiments, may be fabricated in miniaturized forms which resist tampering and are of exceptional mechanical nicety both externally and internally. Such a pressure regulator preferably includes a hollow cylindrical body member, one end of which is internally threaded to serve as an inlet port connection and to receive and hold an externally-threaded insert which centrally carries a coaxial main valve, the movable stem of which is directed inwardly of the body member. Further inside the body member, and trapped there by the insert, is a diaphragm backed by a spring and edge-clamped in sealed relationship with a rigid cartridge member. The exterior of that cartridge member is in turn sealed with an interior surface of the body, but at least one passageway is afforded from the site of the main valve laterally across the diaphragm and around its outer edge and, thence, generally in an axial direction through the body member, to a downstream exit port. Preferably, the passageway around the diaphragm is provided by way of spaces left between the outside of the cartridge member and the surrounding inside surfaces of the body member, and the exit port may extend radially into communication with those spaces.

Accordingly, it is an object of the present invention to provide a unique and advantageous pressure regulator in which a substantially uninterrupted exterior is presented for a distinctive combination of elements concealed in tamper-proof relation within a body after assembly therewithin through an end port.

Further, it is an object to provide an improved fluid-pressure regulator wherein flow is advantageously conducted around the periphery of a diaphragm from one side thereof and past a support to which the diaphragm is sealed on its opposite side.

BRIEF DESCRIPTION OF THE DRAWINGS

Although the aspects and features of this invention which are considered to be novel are expressed in the appended claims, further details as to preferred practices and as to further objects and features thereof may be most readily comprehended through references to the following detailed description when taken in connection with the accompanying drawings wherein:

FIG. 1 is a partly cross-sectioned view of a pressure regulator wherein internal assembly from one end and regulated flow around the edge of a diaphragm are in accordance with the present teachings;

FIG. 2 presents an "exploded" view of principal components which are to be nested within a pressure regulator such as that of FIG. 1; and FIG. 3 is a partly cross-sectioned portion of a pressure regulator like that of FIGS. 1 and 2, on an enlarged scale and with arrows characterizing flow around the diaphragm and its support.

DETAILED DESCRIPTION OF THE PREFERRED EMBODIMENTS

Having reference to the drawings, wherein like reference characters designate identical or corresponding parts throughout the different views, and more particularly to FIG. 1 thereof, one embodiment of an improved fluid-pressure regulator, 4, is shown to include a generally-cylindrical body 5 which exhibits an internally-threaded inlet passageway or port 6 at the bottom end thereof, and an outlet passageway or port 7 disposed nearer its upper end and extending in a substantially radial direction. Gas under pressure, such as oxygen, or propane or Mapp, from a small metal bottle or larger tank, is admitted from below through port 6, as characterized by arrow 6A, and is intended to be discharged through port 7, as characterized by arrow 7A, at a pressure or pressures regulated in accordance with angular settings of a manually-operated knurled knob 8 disposed at the top of the assembly. Flow of incoming fluid, through the central stem 9 of an externally-threaded insert 10 fitted within the internally-threaded inlet port 6, is governed in a known manner by the longitudinal positioning of an axially-movable valve stem 11 of a main valve unit 12 (FIGS. 1 and 2). The latter unit, 12, is preferably of a self-cleaning dual-valving construction such as is disclosed in my U.S. Patent Application Ser. No. 06/085,389, filed Oct. 16, 1979, but it may instead be of a different construction such as that of a common and venerable tire-valve type; both such valves include an axially-movable stem, 11, associated with a valve member which is normally urged to closure with a cooperating valve seat by a spring 13, and cooperating filter elements 14 block some contaminants from the valving site. The illustrated valving unit includes a truncated valving element 15 fixed with stem 11, and cooperating with an elastomeric O-ring 16 and hard seat member 17, and, although spring 13 normally biases the valve unit toward closure, a downward depression of valve stem 11 is effective to open the valve unit so that upstream pressurized fluid will flow past the valve stem in a controlled manner and be emitted in the sense characterized by arrows 11A in FIG. 3. Such depression of the valve stem, and consequent valved flow of fluid, should take place when the pressure of fluid downstream of valve unit 12 is less than some predetermined value, as sensed by the flexible circular diaphragm 18. The latter spreads transversely in relation to the valve stem and engages its downstream end through the thin intermediary disk 19. Near its periphery, the diaphragm is engaged and held on both sides between the oppositely-disposed cooperating rims 10A and 20A of the insert 10 and a special diaphragm support or cartridge member 20, respectively. Hollow support or cartridge 20 has its smaller upper end fitted closely within the upper end of body 5, and has its exterior sealed there with the body by way of an elastomeric O-ring 21; however, the hollow interior of member 20 is in a communication with the ambient atmosphere and its upper surface therefore witnesses atmospheric pressure, as a reference. In addition, the diaphragm upper surface is abutted by a convexly-curved force plate 22 to which a spring 23 applies thrusts variable with the adjustments of knob 8 and with related compressive movements of its shaft 8A threadedly received within the upper end of the cartridge or support member 20. Tortuous paths through the threading allow interior pressure within member 20 to take on the condition of the ambient, while at the same time effectively screening out foreign matter.

The various components which make up the aforementioned regulator assembly are inserted into the body 5 through the lower port 6, with the order represented graphically in the "exploded" view in FIG. 2. Very importantly, the back wall 20B of diaphragm support member 20 is backed directly against an anular shoulder 5B inside cylindrical body 5. Therefore, when the components are assembled, as shown in FIG. 1, the rim 10A of insert 10 forces the marginal portion of diaphragm 18 against rim 20A of the fixedly-held support 20; the resulting bite insures that diaphragm 18 is tightly sealed with support 20. It is not required that fluid-tight sealing exist between the diaphragm and rim 10A of insert 10, however, even though rim 10A should apply forces uniformly enough to maintain the fluid-type seal between the diaphragm and support rim 20A. An O-ring 24 seals insert 10 with body 5 just below rim 10A, such that all fluid released through valve 12 is blocked from travel below that position. Instead, the valved fluid courses laterally in relation to the underside of diaphragm 18 and flows radially outward through small holes 10C and 10D in rim 10A. As may be observed in FIGS. 1 and 3, support member 20 makes a loose fit within body 5, at its lower end, leaving spaces such as 25 (FIG. 3) around its periphery and that of diaphragm 18, thus allowing the valved fluid to travel upwardly around the outer edge of the diaphragm, as characterized by arrows 26 (FIG. 3). Back wall 20B of the enlarged lower end of support member 20 must allow that released fluid to pass, in turn, into the exit port 7. Even though the back wall 20B abuts directly against body shoulder 5B, there are relief grooves or channels 27 extending radially along the back wall and communicating the fluid into upper spaces 28, and, thence, into port 7, as suggested by arrows 29 (FIG. 3). The regulated-pressure flow of fluid around the diaphragm and upwardly therefrom advantageously allows the exit porting and downstream coupling to be situated above the locus of the diaphragm, and yet does not require that the main body 5 be no more than one integral piece. The radial thickness of that body above the diaphragm can be relatively large as shown, and thus exit port 7 can accommodate a sturdy output coupling without requiring that the girth of the body be enlarged. Moreover, ample body material also remains there to receive the spring 30 and catch 31 of a knob-detenting unit actuated by a thumb slide 32.

Once the regulator has been assembled, it may be directly threaded onto a tank, or other suitable fitting, by way of its internally-threaded inlet 6, and, with its knob 8 set to a predetermined angular position, it is effective to maintain the pressure of flow from its downstream coupling 7 at a desired level. If pressure downstream of valve unit 12 should rise above that level, valve stem 11 will move upwardly toward a closure condition, as allowed by upward movement of the diaphragm 18 resulting from increased force produced along its lower surfaces. The pre-set force of spring 23 is then unable to fully counteract the increased differential pressure across the diaphragm until it has been further compressed by upward flexure of the diaphragm. When downstream pressure drops below what is desired, the reverse effects and actions are realized, such that the main valve opens to admit greater flow and restores the intended pressure.

As has been alluded to earlier herein, the main valve may be of a construction different from that illustrated, with useful results nevertheless. Also, in another version, it is not necessary that separate flow passages such as 10C and 10D be provided, and, instead, intentional leakage through serrations or other openings will suffice to bring fluid around the outer edge of the diaphragm, as intended. Further, although spacings between parts, such as spacings 28, are conveniently used to communicate the fluid, other constructions may instead utilize drilled or otherwise-machined passageways to bring the fluid to the outlet. Such an outlet may extend axially and be accessible from the top end. In a pre-set regulator not requiring manipulation of a knob, the axially-disposed outlet may be an internally-threaded end at the top, like the bottom coupling 6, there by creating an unbroken in-line regulator unit.

It should therefore be understood that the specific embodiments and practices shown and described herein have been presented by way of disclosure rather than limitation, and that various modifications, combinations and substitutions may be effected by those skilled in the art without departure in spirit or scope from this invention in its broader aspects and as set forth in the appended claims.

What I claim as new and desire to secure by Letters Patent of the United States is:

1. Apparatus for regulating the valving of fluid, comprising a single-part substantially-cylindrical body having an inlet extending axially into one end thereof and an outlet opening substantially radially through said body at a position axially displaced from the inlet, a cup-shaped insert fitted within said inlet and there sealed peripherally with said body, a spring-activated valve including a seat sealed with said insert at the site of said inlet and a cooperating valve element normally biased toward closure with said seat and having a stem projecting inwardly along the axis of said inlet, a substantially circular and flat diaphragm within said body downstream of said valve and engaging said stem substantially centrally along one side thereof which is exposed to fluid output from said valve, a hollow support fitted coaxially within said body downstream of said insert, said support including a cup-shaped part having its rim sealed fluid-tight with said diaphragm along the periphery thereof on the other side thereof, set spring means within said support for applying force to said other side of said diaphragm axially opposite said stem, said set spring means including a pressure-setting stem extending through said support opposite said diaphragm and further extending outwardly of said body at the downstream end of said body opposite said one end, said hollow support exposing said other side of said diaphragm to atmospheric pressure by way of clearances where said stem extends through said support, said insert being cup-shaped at an inner end and having its rim in engagement with said one side of said diaphragm near the periphery thereof opposite said rim of said hollow support, passageway means formed by spaces between inside surfaces of said body and peripheries of said diaphragm and said support and conducting fluid downstream from said valve around and past the periphery of said diaphragm and part of said support for communication with said outlet, means providing for passage of fluid flow from said valve and to said spaces across the site of said rim of said cup-shaped inner end of said insert, and means sealing the exterior of said support with said body downstream of said passageway means and axially beyond said part of said support to thereby allow said outlet to be in communication with said passageway means while otherwise sealing said passageway means at said downstream end of said body.

2. Apparatus for regulating the valving of fluid as set forth in claim 1 wherein said rim of said hollow support is slightly smaller than the surrounding portion of said body and thereby affords spaces of said passageway means, wherein said cup-shaped part of said support has back surfaces stopped against inner shoulder surfaces of said body, whereby said support is axially fixed within said body and its rim seals with said diaphragm when said rim of said insert engages said diaphragm from said one side thereof, wherein said means providing for passage of fluid flow comprises at least one opening substantially radially through said rim of said insert, and wherein the outer periphery of said rim of said insert is spaced from surrounding inner surfaces of said body to communicate fluid flow from said opening to said passageway means and thence to said outlet.

3. Apparatus for regulating the valving of fluid as set forth in claim 2 wherein said inlet is internally threaded, wherein said insert is proportioned and externally threaded for mating wholly within said threaded inlet while leaving internal threading of said inlet exposed upstream thereof to make an inlet port connection at said one end of said body, wherein said support and diaphragm are of smaller diameter than said inlet, and wherein said hollow support and said set spring means within it and said diaphragm and said insert and said valve are all inserted into said body through said inlet, the end of said pressure-setting-stem extending outwardly of said body at said downstream end of said body having handle means fixed therewith for angular adjustment thereof from outside said body.

* * * * *